United States Patent Office
3,493,635
Patented Feb. 3, 1970

3,493,635
POLYESTER RESINS CONTAINING OXAZOLINE DERIVATIVES
Bernard J. Davis, Biloxi, Wesley J. Ranson, Gulfport, and James N. Holbert, Long Beach, Miss., assignors to Reichhold Chemicals, Inc., White Plains, N.Y.
No Drawing. Filed June 28, 1967, Ser. No. 649,476
Int. Cl. C08f *21/00*
U.S. Cl. 260—868　　　　　　　　　　　　　　7 Claims

ABSTRACT OF THE DISCLOSURE

The present application discloses a process of preparing a copolymerizable blend of an oxazoline compound and a mixture of an unsaturated polyester with a monomer, that contains terminal ethlenic unsaturation. The cured polymer has the unique property to shed water in film form rather than agglomerate and is therefore, particularly useful in the manufacture of reinforced plastic panels for greenhouses.

---

This invention relates to the manufacture of improved stable compositions of matter of unsaturated polyester e.g. alkyds and polymerizable monomers containing

groups i.e. having terminal ethylenic unsaturation, said compositions having incorporated oxazoline compounds and after being catalyzed yielding copolymers of excellent general qualities and having the unique property of shedding water, and to the resulting product.

Compositions of matter containing unsaturated polymerizable monomers and unsaturated polyesters and dihydric alcohols and unsaturated dicarboxylic acids, which compositions are usually known as unsaturated polyester resins have been known as reliable materials capable of catalytically polymerizing to insoluble and infusable copolymers. In particular these unsaturated polyester resins are valuable impregnants for woven cloth, woven fiber glass film, fiber glass mats and similar substrates in that they form after polymerization solid reinforced plastic articles, exhibiting a high degree of strength and durability. These reinforced plastics are often used in the form of panels in the construction of skylight overhangs, sheds, etc., as well as in bowling balls. A particular important application of these reinforced panels is in greenhouses.

Reinforced plastic panels have been used during the past 10 or 15 years to replace glass panes. Thus heavy understructures were eliminated and the light transmission could be regulated to a predetermined degree. However the performance of these panels left much to be desired. An important and disturbing problem is the irregular condensation which occurs, causing spotting on plants and creating general corrosion problems. The droplets usually form on walls and panels, grow during the normal course of the condensation process and eventually fall in an indiscriminatory manner.

It is therefore a principal object of this invention to eliminate this phenomenon. Another object of this invention is to develop a panel which permits the water to condense and subsequently shed it in sheet form to permit a regular flow into channels and also creating a self cleaning action.

A further object of this invention is to develop a reinforced plastic material with improved light transmission properties.

And a further object of this invention is to develop a reinforced plastic material with improved light absorbency.

A still further object of this invention is to develop a reinforced plastic material with improved mar and scuff resistance.

And a further object of this invention is to develop a reinforced plastic material, showing no air retardation.

Still further objects and the scope of applicability of the present invention will become apparent from the detailed description given hereinafter. It should be understood however, that the detailed description and specific examples, while indicated as preferred embodiments of the invention, are given by way of illustration only, since various changes and modifications within the spirit and scope of this invention will become apparent to those skilled in the art from the detailed description.

We have now discovered that above objectives can be attained by incorporating into the unsaturated polyester compositions an oxazoline, having the following structure.

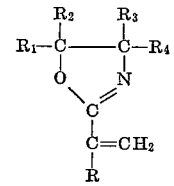

wherein $R_1$, $R_2$, $R_3$ and $R_4$ can be hydrogen, halogen, alkyl, halogenalkyl, hydroxy alkyl, aryl halogenaryl or hydroxyaryl and R can be alkyl, alkylene or aryl.

The addition of the oxazoline is made before the addition of the catalyst. Then it is copolymerized into the polyester resin orienting itself in the final resinous molecule, so that a hydrophobe is extended through the surface creating a coating action. This in turn leads to the water shedding action in an even sheet form. This is due to the slight cationic action of the oxazoline ring giving the entire surface of the polyester a cationic activity, greatly reducing the surface tension of contacting water and allowing it to spread to a uniform thin film rather than to agglomerate. The condensed water runs down evenly taking along accumulated dust and thus exhibiting a very much desired cleaning action. We have also found that the chain length of the alkyl groups has a great effect on the final finished product of the polyester itself. E.g. if an agent is required to be intermixed into the polyester to give this polyester a more effective wetting onto glass, then a very low alkyl type (signified by the letter R in above structural formula) of oxazoline should be employed. This will give the polyester the ability to tightly wet the glass and on polymerization one would have a system which would have very little if any tendency to slow water wicking characteristics.

Conversely, if a surface activity is desired aside from the improved wetting on glass, then, higher molecular weight alkyl groups would have to be employed e.g. myristic acid with 14 or behenic acid with 22 carbon atoms.

In the latter case this would provide a polyester with a marked scuff resistance and increased filming action since the long behenic acid alkyl groups would act as surface lubricant to improve scuff resistance.

The amount of oxazoline employed can vary from 0.01–5%, based on the weight of the polymerizable ester blend, but the preferred range is from 0.1–1% because of the outstanding results achieved therefrom.

A particularly useful oxazoline is an oxazoline which has available one or two free hydroxyl groups, as evidenced by the following structure:

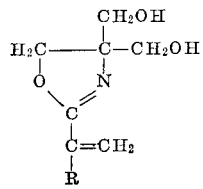

wherein R can be an alkyl group or alkylene group, having 4–22 carbon atoms. But the preferred oxazoline has the structure:

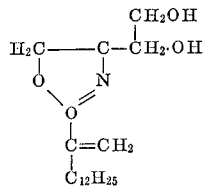

because of the outstanding performances achieved therefrom.

The unsaturated polyester resins to be copolymerized with the oxazoline are conventional material and described in prior art. They are usually made by esterifying at elevated temperatures, dihydric alcohols and alpha-beta ethylenically unsaturated dicarboxylic acids until an acid number of about between 50 and 80 and probably between 20 and 50 is reached, whereupon the resulting alkyd is blended with a polymerizable monomer having at least $>C=CH_2$ groups. The weight ratio of the alkyd to the monomer may be varied between 95:5 and 5:95. In order to facilitate handling of the resins, such as in casting and molding operations, it is generally preferred to use such a ratio in which a syrup resin blend results. Depending upon the kind of monomer and upon the behavior of the alkyd the preferred weight ratio is generally between about 55 alkyd to 45 monomer and 85 alkyd to 15 monomer.

The said dihydric alcohols considered as starting materials for this reaction include saturated and unsaturated aliphatic glycols such as ethyleneglycol, 1-2 propylene glycol, 1-3 propyleneglycol, 1-2 butyleneglycol, 1-4 butyleneglycol, 1-5 pentane diol, the hexyleneglycols, neopentylglycol and the like.

They also include dihydroxypolyethers such as diethyleneglycol, dipropylene glycol, triethyleneglycol and higher polyglycols of waxy consistency and the like. Also cycloaliphatic glycols e.g. hydrogenated bisphenols, etc. can be utilized.

The ethylenically unsaturated alpha-beta dicarboxylic acids considered as starting materials include maleic acid, fumaric acid, aconitic acid, itaconic acid, monochloromaleic acid and the corresponding anhydrides of the cis-acids. These ethylenically unsaturated dicarboxylic acids may be partially replaced with either saturated dicarboxylic acids or those dicarboxylic acids which contain only benzenoid unsaturation. This group includes adipic acid, azelaic acid, sebacic acid, and dimerized fatty acids, phthalic acid, tetrahydrophthalic acid, hexahydrophthalic acid as well as the anhydrides of those acids which are capable of forming it. Up to 10 mols of these dicarboxylic acids having no ethylenic unsaturation may be used per each mol of ethylenically unsaturated dicarboxylic acid. The preferred mol ratio of ethylenically unsaturated dicarboxylic acid to carboxylic acid containing no unsaturation other than benzenoid, is between about 5:1 and 1:5.

This group of polymerizable monomers includes the vinylmonomers, such as styrene, vinyl toluene, diallylphthalate, triallylcyanurate, triallylcitrate, diallylmaleate, diallylfumarate, the monomers of dichlorostyrene, etc. It further includes methyl methacrylate, ethyl methacrylate, methylacrylate, ethylacrylate and the like.

Stabilizers for the unsaturated polyester resins may also be used. They include compounds of phenolic and quinoid structure, such as hydroquinone, tertiarybutylcatechol, qiunone, etc. Other suitable stabilizers include quaternary ammonium salts, esters of phosphorous acid, copper salts, gaseous oxygen, etc., as is well known in the art. Vinyl polymerization initiators being an integral part of the system include organic azo compound such as azobisisobutyronitrile and peroxides and hydroperoxides such as cumene hydroperoxide, benzoylperoxide, methylethylketoneperoxide, cyclohexanone peroxide, lauroyl peroxide, tertiary butylperbenzoate, diacetylperoxide and the like. But the preferred peroxide is the benzoylperoxide because of the outstanding performances achieved therefrom. The following examples are presented to better illustrate and describe the invention rather than limit it to the particular details set forth herein:

EXAMPLES (A) Preparation of the Resin A

To a 3000 cc. round bottom, three necked flask, fitted with agitator, an inert gas sparge tube and descending condenser were charged 490 gms. (5 mols) of maleic anhydride, 741 gms. (5 moles) of phthalic anhydride and 1167 gms. (11 moles) of diethyleneglycol. This mixture was then heated slowly with agitation to 150° C. over a period of 2 hrs. and then increased to 195° C. over another period of 2 hrs. at a rate of 15° C. per hour until a temperature of 230° C. was reached. At this point the acid number was 70. Subsequently the temperature was increased to 245° C. and held at that temperature until acid number was less than 50. The resin was then allowed to cool to 100° C. and 0.003% tertiary butyl catechol was added as an inhibitor.

100 parts of the foregoing polyester were now dissolved in 42.8 parts of styrene monomer, by running the warm polyester into the styrene monomer with good stirring. As soon as the resin was dissolved the mixture was allowed to cool and then kept in cold storage. The viscosity of this mixture (now called Resin A) was 750 cps. at 25° C. color water white, acid number 35 and the amount of nonvolatiles was 70%.

(B) Evaluation (a) Tests for light stability and water shedding.—An amount of oxazoline, as specified in the second column of Table 1 was added to 100 gm. of Resin A. Thereafter 1 gm. of benzoyl peroxide was added to this mixture. 16 test samples were prepared as follows:

12 pieces 6" x 9" of glass cloth No. 181 with finish No. 114 were cut and weighed. (about 85 gms.). About 4–5 gms. of catalyzed Resin A were spread with a spatula on one side of each piece. A piece of glass cloth treated with Resin A was then applied with a spatula on the upper side of the cloth of the remaining 11 pieces and the remaining 11 pieces were then placed on top of each other with the wet side up. The total amount of Resin A used was 57 gms., which gave a glass cloth to resin ratio of 60:40. The sandwich was then covered with another piece of cellophane and then left for an hour so that the resin had time to gel. The laminate was cured in a press at 125° C. at 30 p.s.i. for 25 minutes. Results of these tests are shown in Table 1.

TABLE 1

| Sample No. | Percent Oxazoline [1] | Discoloration | Water shedding |
|---|---|---|---|
| 1 | 0.1 | None | OK. |
| 2 | 0.2 | do | OK. |
| 3 | 0.3 | do | OK. |
| 4 | 0.4 | do | OK. |
| 5 | 0.5 | do | OK. |
| 6 | 0.6 | do | OK. |
| 7 | 0.7 | do | OK. |
| 8 | 0.8 | Very slight | OK. |
| 9 | 0.9 | do | OK. |
| 10 | 1.0 | Slight | OK. |
| 11 | .01 | None | Very slight. |
| 12 | .02 | do | Slight. |
| 13 | .03 | do | OK. |
| 14 | .04 | do | OK. |
| 15 | .05 | do | OK. |
| 16 | 0 | do | None. |

[1] The oxazoline employed in the foregoing test had the following structure:

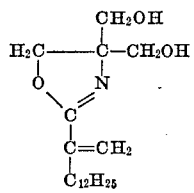

The discoloration of the panels as compared to the control panel (#16) was measured visually by transmitted light. Though test 9 and 10 showed a very slight amber tint, total transmitted light was not affected when measured physically. Test #10 showed a slight amber-tint and a total reduction of transmitted light of less than 1%.

The water shedding characteristics were evaluated as follows:

Panels were placed as the top surface of a 6" cube. They were tilted at a 30° angle to the base, and saturated steam introduced through the bottom for 30 seconds. The side panels were glass. The steam was cut off and the manner in which condensation formed on the top panels was observed. On the control panel, water simply beaded and dropped to the floor of the cube. In test #11 and 12, only one drop formed. In #11 the drop fell, in #12 it ran to the low side of the plate. In all other cases, the condensed water simply spread evenly over the surface and then ran to the low side.

These tests indicated that concentrations of oxazoline as low as .03% were effective in causing water to sheet over the panel surface and prevent drippage.

Three more samples (#17, 18, and 19) were prepared as outlined above, but wax was added to the catalyzed Resin A instead of oxazoline to test its efficiency over oxazoline. The results are shown in Table 2.

TABLE 2

| Sample No. | Percent Atlantic Wax 173 | Water shedding |
|---|---|---|
| 17 | .03 | None |
| 18 | .05 | None |
| 19 | .1 | None |

These tests indicated that a paraffin wax demonstrates no water shedding efficiency, even though the wax is commonly employed at .03% to improve air curing efficiency.

(b) Test for air retardation.—Test panel #13 was repeated to compare with test panel #17. Instead of press curing, the panels were allowed to air cure over a period of several hours. In both cases 0.05% diethylaniline was added to speed up the cure. Both panels air cured in an identical manner, indicating that the oxazoline is as effective as wax in eliminating air retardation.

(c) Test for resin-glass bond strength.—Panels #1 through 19 were cut diagonally and ½ of each resultant pair was immersed in water at 100° F. for 48 hours. At the end of the period, the panels were dried by wiping off water and exposing them to 100° F. for 12 hours in an air circulating oven. Water encroachment along the cut fiber ends could then be seen as a hazy translucency corresponding to the depth of water encroachment. The only panels that demonstrated water encroachment were:

Inch
16 (control) _____ ½
17 _____ ½
18 _____ ½
19 _____ ½
11 _____ ⅛
12 _____ 1/16

This indicates that the oxazoline improves the resin to glass bond by its surface active capabilities.

(d) Test for mar and scuff resistance.—Samples 1 through 19 were tested and the test for resistance to scuffing was based on an arbitrary evaluation, by obliquely striking the panel with the edge of a quarter repeatedly. The scuff resistance increased with the amount of oxazoline added. Samples 5 through 10 were completely free of any scuff marks.

The invention has been described in detail for the purpose of illustration, but it will be obvious to those skilled in the art that numerous modifications may be resorted to without departing from the spirit of the invention as defined in the following claims.

We claim:

1. A polymerizable blend suitable for forming a resin by catalytic polymerization comprising (A) an unsaturated polyester of (1) a dihydric alcohol and (2) an ethylenically unsaturated dicarboxylic acid, (B) a polymerizable monomer containing terminal ethylenic unsaturation (C) an oxazoline having the formula

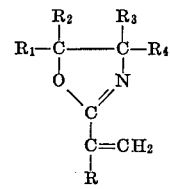

wherein $R_1$, $R_2$, $R_3$ and $R_4$ are selected from the group consisting of hydrogen, halogen, alkyl, halogenalkyl, hydroxyalkyl, aryl, halogenaryl and hydroxyaryl radicals and wherein R is selected from the group consisting of alkyl, alkylene and aryl radicals, said alkyl, halogenalkyl and hydroxyalkyl radicals carrying more than 5 carbon atoms, said oxazoline compound being within the range of from about 0.01%–about 5%, based on the weight of the polymerizable blend and (D) a vinylpolymerization initiator.

2. A polymerizable blend suitable for forming a resin by catalytic polymerization comprising (A) an unsaturated polyester of (1) a dihydric alcohol and (2) an ethylenically unsaturated dicarboxylic acid, (B) a polymerizable monomer, containing terminal ethylenic unsaturation (C) an oxazoline having the formula

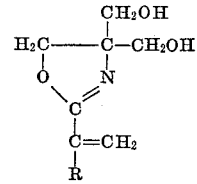

wherein R is selected from a group consisting of alkyl and alkylene radicals, carrying from 4–22 carbon atoms, and said oxazoline compound being within the range of from about 0.01%–about 5%, based on the weight of the polymerizable blend and (D) a vinylpolymerization initiator.

3. A blend according to claim 1 where the range of the oxazoline compound is from about 0.1%–about 1%, based on the weight of the polymerizable blend.

4. A polymerizable blend suitable for forming a resin by catalytic polymerization comprising (A) an unsaturated polyester of (1) diethyleneglycol and (2) a mixture of maleic anhydride and phthalic anhydride (B) styrene (C) an oxazoline having the formula,

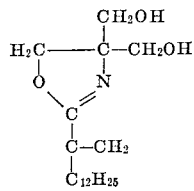

said oxazoline compound being within the range of from about 0.1%–about 1%, based on the weight of the polymerizable blend and (D) a vinylpolymerization initiator.

5. A blend according to claim 4, wherein the vinyl polymerization initiator is benzoylperoxide.

6. A resin prepared by catalytic polymerization of the blend defined in claim 4.

7. A process of preparing a resin which comprises catalytically polymerizing a blend comprising (A) an unsaturated polyester of (1) a dihydric alcohol and (2) an ethylenically unsaturated dicarboxylic acid, (B) a polymerizable monomer containing terminal ethylenic unsaturation (C) an oxazoline having the formula

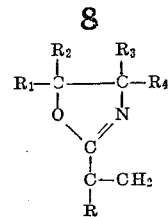

wherein $R_1$, $R_2$, $R_3$ and $R_4$ are selected from the group consisting of hydrogen, halogen, alkyl, halogenalkyl, hydroxyalkyl, aryl, halogenaryl and hydroxyaryl radicals and wherein R is selected from the group consisting of alkyl, alkylene and aryl radicals, said alkyl, halogenalkyl and hydroxyalkyl radicals carrying more than 5 carbon atoms, said oxazoline compound being within the range of from about 0.01%–about 5%, based on the weight of the polymerizable blend and (D) a vinylpolymerization initiator.

References Cited

UNITED STATES PATENTS

| | | | |
|---|---|---|---|
| 2,818,399 | 12/1957 | Drechsel | 260—868 |
| 2,882,257 | 4/1959 | Hessel | 260—868 |
| 2,891,025 | 6/1959 | Price | 260—868 |
| 2,898,259 | 8/1959 | Wheelock | 260—868 |

MURRAY TILLMAN, Primary Examiner

J. T. GOOLKASIAN, Assistant Examiner

U.S. Cl. X.R.

260—307